Oct. 30, 1934.  A. Y. DODGE  1,978,416
VARIABLE SPEED TRANSMISSION
Original Filed Aug. 11, 1930   2 Sheets-Sheet 2

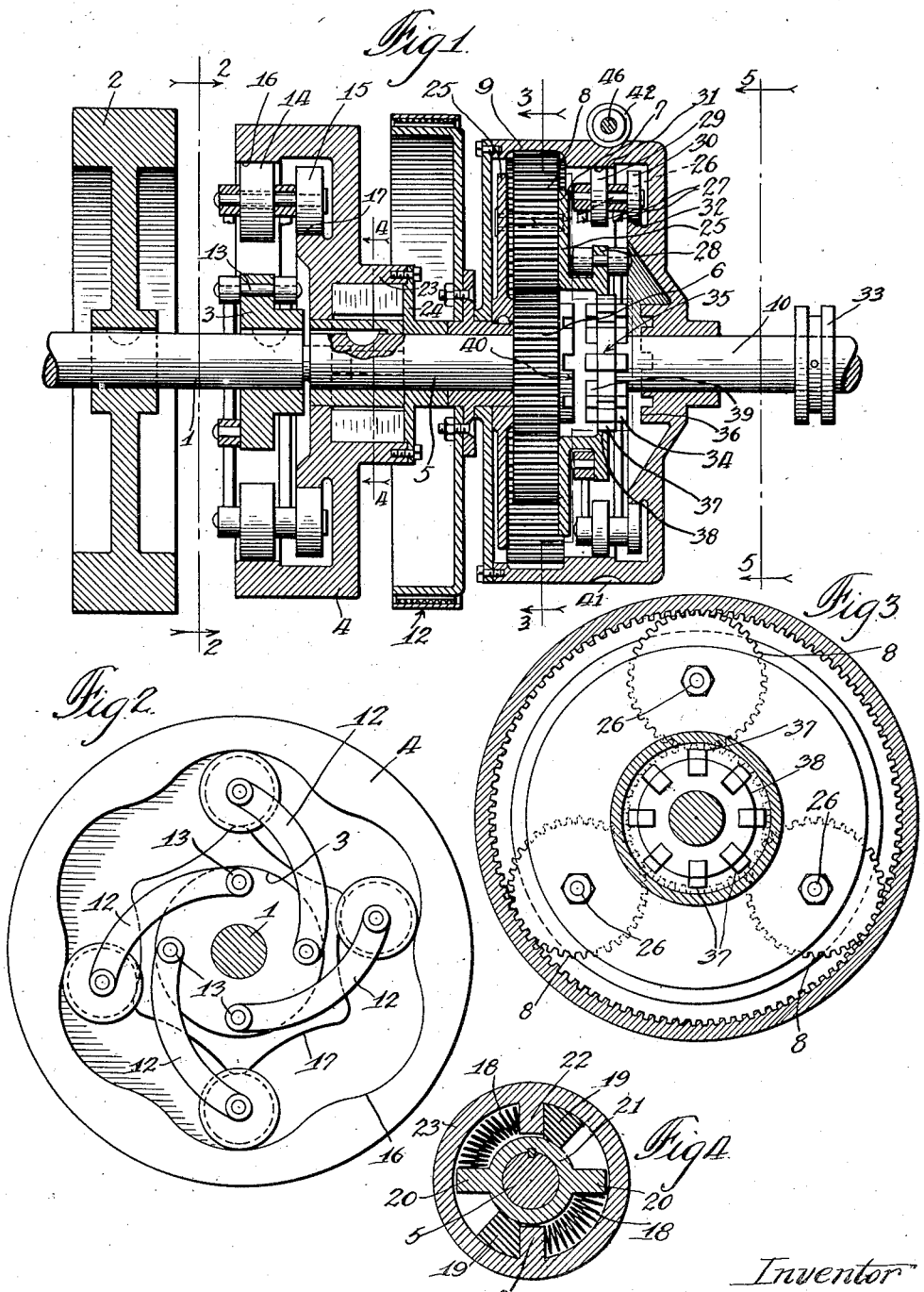

Inventor.
Adiel Y. Dodge,
By
Jones, Addington, Ames & Seibold.
Attorneys.

Patented Oct. 30, 1934

1,978,416

UNITED STATES PATENT OFFICE 1,978,416

VARIABLE SPEED TRANSMISSION

Adiel Y. Dodge, South Bend, Ind.

Application August 11, 1930, Serial No. 474,381
Renewed January 7, 1933

12 Claims. (Cl. 74—34)

My invention relates to variable speed transmission.

One of the objects of my invention is to provide an improved variable speed transmission suitable for automobiles and the like, in which an improved automatic pick-up is provided between the engine and the propeller shaft.

A further object is to provide an improved automatic pick-up transmission in which improved means are provided for reverse.

A further object is to provide an improved automatic pick-up transmission in which improved means are provided for positive low speed forward.

Further objects will appear from the description and claims.

This application contains claims readable on the disclosure of my application, Serial No. 180,403, filed April 2, 1927.

In the drawings, in which an embodiment of my invention is shown,

Figure 1 is an axial sectional view;

Fig. 2 is a section substantially on the line 2—2 of Fig. 1;

Fig. 3 is a section substantially on the line 3—3 of Fig. 1;

Fig. 4 is a section substantially on the line 4—4 of Fig. 1; and

Figure 5:
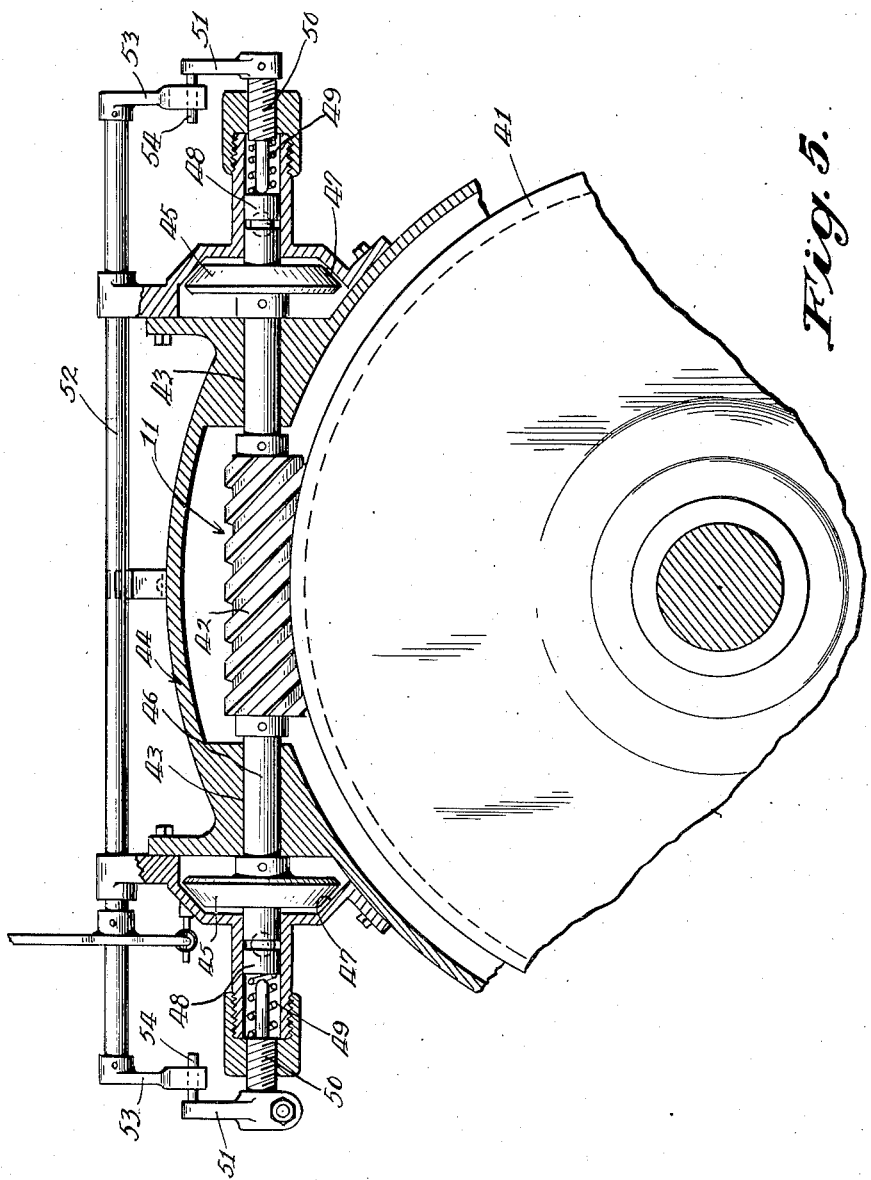
Fig. 5 is a section on the line 5—5 of Fig. 1.

Referring to the drawings, the construction shown therein comprises a driving shaft 1, which may be the extension of the crank shaft of the internal combustion engine for an automobile, a fly-wheel 2 keyed thereto, a driving rotor 3 also keyed thereto, a driven fly-wheel rotor 4, centrifugal mass inertia transmission between said driving rotor and said driven rotor, an intermediate shaft 5, a cushioning impulse transmission between said driven rotor 4 and said intermediate shaft 5, a sun gear 6 rotatable with said intermediate shaft 5, a rotatable gear carrier 7 coaxial with said sun gear 6, planetary gearing 8 mounted on said gear carrier and meshing with said sun gear, a driven ring gear 9 meshing with said planetary gearing, a second mass inertia transmission acting between said gear carrier 7 and driven ring gear 9, a driven shaft 10 which may be shifted axially to any one of four different positions so that it may be in neutral, connected with the ring gear, connected with the gear carrier, or connected with the sun gear, a reversible impulse rectifying clutch 11 for holding the ring gear against reverse rotation to effect low speed positive forward and intermediate variable forward speeds under one set of conditions and to effect reverse rotation of the ring gear under another set of conditions, and clutch means 12 for holding the gear carrier against rotation to effect reverse movement of the ring gear.

Referring to the construction more in detail, the mass inertia transmission between the driving rotor 3 and the driven rotor 4 may be similar to that disclosed in my copending application, Serial No. 439,285. It comprises four pairs of swinging arms 12 pivotally mounted at 13 on the rotor 3, each pair of arms being provided at their swinging ends with a pair of anti-friction rollers 14 and 15 for engagement, respectively, with a pair of undulating cam track ways 16 and 17 on the driven rotor 4.

The cushioning impulse transmission between the driven rotor 4 and the intermediate shaft 5 may also be similar to that disclosed in my copending application, Serial No. 439,285, and comprises resilient members such as coil compression springs 18 or blocks of rubber 19 positioned between outwardly extending vanes 20 on a collar 21 keyed to the intermediate shaft 5 and inwardly extending vanes 22 on the collar portion 23 of the driven rotor 4.

A flanged collar 24 may be provided, rotatable freely on the shaft 5 and secured to the collar 23 for providing an additional bearing support for the rotor 4.

The epicyclic gearing including the sun gear 6, the planetary gearing 8 and the ring gear 9, may in general be similar to that disclosed in my copending applications, Serial No. 180,403, filed April 2, 1927, and Serial No. 493,950, filed November 7, 1930, and the present application is a continuation in part of application Serial No. 180,403 as to such subject matter. The gear carrier comprises a pair of plates 25 between which the planetary gearing 8 is mounted on short bearing shafts 26 extending between the plates.

The second mass inertia transmission between the gear carrier 7 and the ring gear 9 may be similar to the mass inertia transmission between the rotors 3 and 4 previously described, comprising the pairs of swinging arms 27 mounted on ears or flanges 28 on the gear carrier plate 25 and anti-friction rollers 29 and 30 mounted on the swinging ends of these arms 27 and engaging, respectively, the undulating cam track ways 31 and 32 on the ring gear 9.

The driven shaft 10 may be shifted axially by means of the annularly grooved collar 33 to any one of four different positions. In its extreme right-hand position the laterally extending teeth 34 of the dog clutch 35 engage the laterally extending teeth 36 of the ring gear 9 so that the shaft 10 must revolve with the ring gear. This would be the position for reverse and it might be the position for all intermediate forward speeds.

When the shaft 10 is in the position next to its extreme right-hand position, none of the teeth of the dog 35 are in engagement with any other part and the shaft 10 is consequently in neutral.

In the next shift to the left, that is to say, in the position next to the extreme left-hand position, the radially extending dog teeth 37 are in engagement with correspondingly-shaped radial notches in the inwardly extending flange 38 of the gear carrier, so that in this position the driven shaft 10 must rotate with the gear carrier. This is the position for positive low speed forward and for intermediate forward speeds, the ring gear being held against reverse rotation by the impulse rectifying clutch 11.

In the extreme left-hand position the left-hand laterally extending teeth 39 of the dog clutch 35 are in engagement with the correspondingly-shaped notches in the clutch member 40 formed integrally with the sun gear 6. This is the direct drive for high speed forward, in which the driven shaft 10 rotates as a unit with the intermediate shaft 5.

The reversible impulse rectifying clutch construction comprises a worm gear 41 formed as an integral part of the ring gear 9, a worm 42 meshing with this worm gear and mounted in suitable spaced bearings 43 in the housing 44, and capable of slight endwise movement in said spaced bearings, a pair of conical friction discs 45 mounted on the shaft 46 of the worm, a pair of conical friction surfaces 47 cooperating with the friction discs 45, respectively, a pair of slidably mounted thrust-bearing members 48 cooperating with the ends of the worm shaft, a pair of coil compression springs 49 for holding the thrust-bearing members in cooperative relation with respect to the ends of the worm shaft, and means for selectively placing either one of the friction discs 45 in condition to be forced by endwise movement of the worm shaft into engagement with the cooperating conical friction surface 47. The latter means comprises a pair of screws 50 engageable with the thrust bearings, respectively, a pair of rock arms 51 mounted on the screws 50, respectively, a rock shaft 52, and a pair of forked rock arms 53 mounted on this rock shaft and engageable with the pins 54 on the rock arms.

In operation, the impulse rectifying construction may be set so as to permit free rotation of the worm gear in one direction, but so as to prevent rotation of the worm gear in the opposite direction. If it is desired to permit clockwise rotation of the worm gear as seen in Fig. 5, the rock shaft 52 is moved to a position which will shift the right-hand slidably mounted thrust bearing to the left, to an extent sufficient to prevent any contact between the right-hand friction disc 45 and its corresponding friction surface 47 (but not, however, far enough to actually bring the left-hand friction disc 45 into contact with its corresponding friction surface 47). With this setting, if an impulse is exerted on the worm gear, tending to move it in a clockwise direction, there will be practically no resistance offered to this rotation by the worm as it can rotate freely, both of the friction discs being out of engagement with their respective friction surfaces. However, if an impulse is exerted on the worm gear, which gives it a very slight counterclockwise rotation, the left-hand friction disc 45 will immediately be moved into engagement with its friction surface 47, and due to the mechanical advantage offered by the friction disc and worm, counterclockwise rotation of the worm gear will be prevented. The disengagement of the left-hand friction disc with its friction surface is permitted because of the fact that the screw 50 which controls the thrust bearing 48 has been moved to a position in which it is a slight distance away from the adjacent end of the thrust bearing.

In order to cause reverse or counterclockwise rotation of the worm gear the rock shaft 52 is moved to a position which will cause the left-hand thrust bearing 48 to slide to a position which will prevent the left-hand friction disc 45 from engaging its friction surface 47 and which will withdraw the screw 50 which controls the right-hand thrust bearing 48 from engagement with this thrust bearing sufficiently to permit the right-hand friction disc 45 to engage its friction surface 47 upon clockwise rotation of the worm gear. Under this set of conditions the worm gear can rotate freely in a counterclockwise direction because of the fact that the left-hand friction disc cannot engage its friction surface. However, if an impulse is exerted on the worm gear, which moves it slightly in a clockwise direction, the right-hand friction disc will immediately engage its friction surface and prevent clockwise rotation of the worm gear.

In operation, assuming that the transmission is in use for driving an automobile, the shaft 1 rotating with the crank shaft of the engine and the driven shaft 10 rotating with the propeller shaft, and assuming also that the car is standing still and it is desired to drive it in a forward direction, the driven shaft 10 is shifted to the extreme right-hand position to connect it with the ring gear 9 and the engine is put in operation. As the shaft 1 rotates, causing the driving rotor 3 to rotate, the driven rotor 4 will automatically begin to pick up, rotating in the same direction as the rotor 3, due to the mass inertia transmission between the rotors 3 and 4. The rotor 4 will cause the rotation therewith of the intermediate shaft 5 and sun gear 6 through the cushioning impulse transmission. As the clutch 11 is in condition to prevent reverse rotation and the gripping device 12 is in disengaging position, the rotation of the sun gear 6 will cause a rotation of the gear carrier 7 in the same direction, though at first at a reduced speed. This rotation of the gear carrier 7 will cause the driven ring gear 9 to start rotating and to pick up in speed because of the mass inertia transmission between the gear carrier 7 and this driven gear. It is possible for the driven rotor 4 and the ring gear 9 to continue to pick up in speed until they rotate at the same speed as the drive shaft 1, but in order to prevent any possible slippage and to secure a direct one to one drive, the driven shaft 10 may be shifted to the left to connect the driven shaft 10 with the sun gear 6 when the speed reaches one to one.

In cases where it might be desirable to effect a faster pick-up and more immediate and positive forward drive, shaft 10 might, at the beginning, be moved to and held in the position in which it is connected with the gear carrier 7, the impulse rectifying clutch 11 serving to hold the ring gear against reverse rotation. This would immediately effect a low speed positive forward drive of the gear carrier 7, and as the speed of the gear carrier 7 increases, the centrifugal force effect of the mass inertia transmission on the ring gear will cause the ring gear to start rotating and to rotate faster and faster until it is up to the speed of the gear carrier, after which the whole transmission will rotate substantially as a unit.

For reverse, the driven shaft 10 would be connected with the sun gear 9, the clutch 11 would be put into condition to prevent reverse rotation, and the clutch 12 would be engaged with the clutch drum secured to the sleeve to which the gear carrier 7 is secured, thus holding the gear carrier 7 against rotation. The rotation of the sun gear 6 would then cause a reverse rotation of the ring gear 9, though at a lower rate of speed.

It will be seen that this construction provides a transmission which is well adapted for automobile work in that it has two mass inertia transmissions in series, each having a graduated action, and in that it enables reverse and positive low speed forward to be obtained by means of the epicyclic gearing. The impulse rectifying clutch 11 is shown and claimed in my copending application, Serial No. 468,786, filed July 18, 1930.

I claim:

1. A combination planetary and impulse transmission comprising a driving gear, a gear carrier, planetary gearing mounted on said gear carrier and meshing with said driving gear, a driven gear meshing with said planetary gearing, alternating impulse centrifugal transmission acting between said gear carrier and driven gear, impulse rectifying means acting on said driven gear to cause it to rotate in the same direction as the driving gear, and alternating impulse driving means for rotating the driving gear.

2. A combination planetary and impulse transmission comprising a driving gear, a gear carrier, planetary gearing mounted on said gear carrier and meshing with said driving gear, a driven gear meshing with said planetary gearing, alternating impulse centrifugal transmission acting between said gear carrier and driven gear, impulse rectifying means acting on said driven gear to cause it to rotate in the same direction as the driving gear, alternating impulse driving means for rotating the driving gear, and torsionally yieldable transmission between said alternating impulse driving means and said driving gear.

3. In a variable speed transmission, the combination of a mass inertia clutch comprising undulated cams and rollers, rollers driven through swinging arms by the driving shaft, undulated cams connected to the driving shaft of the transmission through a yieldable coupling, and a planetary transmission comprising at least three members including two coaxial gears and planet gearing between said two gears, one member of said planetary gearing being driven from said shaft.

4. A transmission comprising a combination planetary and impulse transmission having a driving gear, a gear carrier, planet gearing mounted on said gear carrier and meshing with said driving gear, a driven gear meshing with said planetary gearing, alternating mass inertia impulse means associated therewith for urging the ring gear into positive and negative rotation, said impulse means being independent of said planetary gearing, a one-way clutch acting on said ring gear to prevent its reverse rotation and permit its forward rotation, means for reversing the one-way clutch means to allow the ring gear to rotate in the reverse rotation to that of the driving gear, said one-way clutch also absorbing as a reactionary member all increase in torque over and above the torque put in through driving shaft, and means to selectively connect the final driven shaft with the driving gear, the driven gear or the planetary cage, and means for holding the planet gear cage against rotation to effect reverse rotation of driven shaft when desired.

5. A transmission comprising a planetary gear including three elements, viz. a sun gear and an internal gear and a planetary unit made up of a gear carrier having planet gears connecting the sun gear and the internal gear, alternating-impulse torque-amplifying means operated by one of said elements and separate therefrom and acting directly on another of said elements to give a variable-speed drive therebetween, and means acting directly on one of said elements for absorbing reversely-acting impulses of said alternating-impulse means.

6. A transmission comprising a planetary gear including three elements, viz. a sun gear and an internal gear and a planetary unit made up of a gear carrier having planet gears connecting the sun gear and the internal gear, alternating-impulse torque-amplifying means driven by said planetary unit and acting directly on said internal gear to give a variable-speed drive therebetween, in addition to the drive by the planet gears, and means acting directly on said internal gear for absorbing reversely-acting impulses of said alternating-impulse means.

7. A transmission comprising a planetary gear including three elements, viz. a sun gear and an internal gear and a planetary unit made up of a gear carrier having planet gears connecting the sun gear and the internal gear, alternating-impulse torque-amplifying means operated by one of said elements and acting on another of said elements to give a variable-speed drive therebetween, and means acting directly on one of said elements for absorbing reversely-acting impulses of said alternating-impulse means, one of said three elements having a yielding drive cushioning the action of the impulse means.

8. A transmission comprising a planetary gear including three elements, viz. a sun gear and an internal gear and a planetary unit made up of a gear carrier having planet gears connecting the sun gear and the internal gear, alternating-impulse torque-amplifying means operated by one of said elements and acting on another of said elements to give a variable-speed drive therebetween, and means acting directly on one of said elements for absorbing reversely-acting impulses of said alternating-impulse means, the sun gear having a yielding drive cushioning the action of the impulse means.

9. A variable speed transmission comprising a driving gear, a rotatable gear carrier coaxial with said gear, gearing mounted on said gear carrier and meshing with said driving gear, a reversible gear coaxial with said driving gear and meshing with said gearing, means for holding said gear carrier against movement to cause reverse movement of the reversible gear, and a driven member alternatively connectible to rotate either with the gear carrier or with the reversible gear, said reversible gear and gear carrier being provided with clutch members respectively and a single axially shiftable clutch member shiftable between the clutch members on the reversible gear and gear carrier for effecting said alternative connection.

10. A variable speed transmission comprising planetary gearing including a sun gear, a gear carrier and a ring gear, means for driving said sun gear, means for preventing rotation of said ring gear in one direction and means responsive to the speed of rotation of said gear carrier for variably resisting relative rotation between the gear carrier and the ring gear.

11. A variable speed transmission comprising planetary gearing including a sun gear, a gear carrier and a ring gear, means for driving said sun gear, means for preventing rotation of said ring gear in one direction and means responsive to the speed of rotation of said gear carrier for variably resisting relative rotation between the gear carrier and the ring gear, said last named means including pivotally mounted rollers carried by said gear carrier and adapted to be forced into engagement with said ring gear by centrifugal force.

12. In an infinitely variable-speed, torque-amplifying transmission, the combination of planetary gearing including a driving gear, a set of planetating gears coaxial therewith and a third gear meshing with the planetating gears, a driven member, means for alternately connecting the driven member with the planetating gears or the third gear, means for preventing rotation of the third gear in one direction and means for gradually increasing the speed of rotation of the planetating gears bodily about the center of the driving gear to effect intermediate ratios.

ADIEL Y. DODGE.